US006423398B1

(12) United States Patent
Lawrence et al.

(10) Patent No.: US 6,423,398 B1
(45) Date of Patent: Jul. 23, 2002

(54) INK JET PRINTING METHOD

(75) Inventors: Kristine B. Lawrence, Rochester; Tien-Teh Chen, Penfield; Yongcai Wang, Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/770,122

(22) Filed: Jan. 26, 2001

(51) Int. Cl.[7] .............................. B41M 5/00; B41J 2/01
(52) U.S. Cl. ....................................... 428/195; 347/105
(58) Field of Search ........................... 347/105; 428/195

(56) References Cited

FOREIGN PATENT DOCUMENTS

EP    1 002 660 A1    5/2000

*Primary Examiner*—Bruce H. Hess
(74) *Attorney, Agent, or Firm*—Harold E. Cole

(57) ABSTRACT

An ink jet printing method, comprising the steps of:

A) providing an ink jet printer that is responsive to digital data signals;

B) loading the printer with ink-receptive elements comprising a support having thereon an image-receiving layer comprising a binder and cationic polymer particles containing at least one ethylenically unsaturated monomer containing a trialkylammonium salt, each the trialkylammonium salt containing at least one alkyl group greater than 4 carbon atoms in length;

C) loading the printer with an ink jet ink composition comprising water, a humectant, and a water-soluble anionic dye; and D) printing on the image-receiving layer using the ink jet ink in response to the digital data signals.

14 Claims, No Drawings

INK JET PRINTING METHOD

CROSS REFERENCE TO RELATED APPLICATIONS

Reference is made to commonly assigned, co-pending U.S. Pat. applications:

Ser. No. 09/770,814, pending by Bermel et al., filed of even date herewith entitled "Ink Jet Recording Element";

Ser. No. 09/771,191, by Bermel et al., filed of even date herewith entitled "Ink Jet Recording Element";

Ser. No. 09/770,429, pending, by Bermel et al., filed of even date herewith entitled "Ink Jet Recording Element";

Ser. No. 09/770,189, pending by Bermel et al., filed of even date herewith entitled "ink Jet Recording Element";

Ser. No. 09/771,189, pending by Bermel et al., filed of even date herewith entitled "Ink Jet Printing Method";

Ser. No. 09/770,433, pending Bermel et al., filed of even date herewith entitled "Ink Jet Printing Method";

Ser. No. 09/770,807, pending by Bermel et al., filed of even date herewith entitled "Ink Jet Printing Method";

Ser. No. 09/770,728, pending Bermel et al., filed of even date herewith entitled "Ink Jet Printing Method";

Ser. No. 09/728,128, pending by Lawrence et al., filed of even date herewith entitled "Ink Jet Printing Method";

Ser. No. 09/770,127, pending Lawrence et al., filed of even date herewith entitled "Ink Jet Printing Method";

Ser. No. 09/770,781, pending by Lawrence et al., filed of even date herewith entitled "Ink Jet Printing Method";

Ser. No. 09/771,251, pending by Lawrence et al., filed of even date herewith entitled "Ink Jet Printing Method";

Ser. No. 09/772,097, by Lawrence et al., filed of even date herewith entitled "Ink Jet Printing Method"; and Ser. No. 09/770,431 by Lawrence et al., filed of even date herewith entitled "Ink Jet Printing Method", now U.S. Pat. No. 6,347,867.

FIELD OF THE INVENTION

This invention relates to an ink jet printing process for improving the light stability, waterfastness, gloss and density of a printed image containing an ink jet ink containing a water-soluble anionic dye and a cationic receiver.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant which is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

An ink jet recording element typically comprises a support having on at least one surface thereof an ink-receiving or image-forming layer. The ink-receiving layer may be a polymer layer which swells to absorb the ink or a porous layer which imbibes the ink via capillary action.

Ink jet prints, prepared by printing onto ink jet recording elements, are subject to environmental degradation. They are especially vulnerable to water smearing, dye bleeding, coalescence and light fade. For example, since ink jet dyes are water-soluble, they can migrate from their location in the image layer when water comes in contact with the receiver after imaging. Highly swellable hydrophilic layers can take an undesirably long time to dry, slowing printing speed, and will dissolve when left in contact with water, destroying printed images. Porous layers speed the absorption of the ink vehicle, but often suffer from insufficient gloss and severe light fade. There is a need to provide an ink jet recording element which overcomes the above deficiencies.

EP Publication 1 002 660 A1 discloses an ink jet recording sheet containing an image-receiving layer containing a water soluble cationic polymer derived from a vinylbenzyl-trialkylammonium salt. The specific examples of alkyl moieties in these salts include only methyl, benzyl and hydroxy-ethyl. However, there is a problem with polymers derived from these salts in that they are water soluble and images formed in the image-receiving layer has poor light stability, as will be shown hereafter.

U.S. Pat. No. 6,045,917 relates to the use of poly(N-vinyl benzyl-N,N,N-trimethyl ammonium chloride-co-ethyleneglycol dimethacrylate) particles in an ink jet image-recording layer. However, there is a problem with these particles in that images formed in the image-receiving layer have poor light stability, as will be shown hereafter.

It is an object of this invention to provide an ink jet printing method using anionic dyes suitable for use in aqueous inks for ink jet printing that will provide images with better light stability, waterfastness, gloss and density using certain receiver elements.

SUMMARY OF THE INVENTION

This and other objects are achieved in accordance with this invention which relates to an ink jet printing method, comprising the steps of:

A) providing an ink jet printer that is responsive to digital data signals;

B) loading the printer with ink-receptive elements comprising a support having thereon an image-receiving layer comprising a binder and cationic polymer particles containing at least one ethylenically unsaturated monomer containing a trialkylammonium salt, each the trialkylammonium salt containing at least one alkyl group greater than 4 carbon atoms in length;

C) loading the printer with an ink jet ink composition comprising water, a humectant, and a water-soluble anionic dye; and D) printing on the image-receiving layer using the ink jet ink in response to the digital data signals.

It has been found that use of the above dyes and image-receiving layer provides excellent light stability, waterfastness, gloss and density.

DETAILED DESCRIPTION OF THE INVENTION

Any anionic, water-soluble dye may be used in composition employed in the method of the invention such as a dye having an anionic group, e.g., a sulfo group or a carboxylic group. The anionic, water-soluble dye may be any acid dye, direct dye or reactive dye listed in the COLOR INDEX but is not limited thereto. Metallized and non-metallized azo dyes may also be used as disclosed in U.S. Pat. No. 5,482,545, the disclosure of which is incorporated herein by reference. Other dyes which may be used are found in EP 802246-A1 and JP 09/202043, the disclosures of which are incorporated herein by reference. In a preferred embodiment, the anionic, water-soluble dye which may be used in the composition employed in the method of the invention is a metallized azo dye, a non-metallized azo dye, a xanthene dye, a metallophthalocyanine dye or a sulfur dye. Mixtures of these dyes may also be used. An example of an anionic dye which may be used in the invention is as follows:

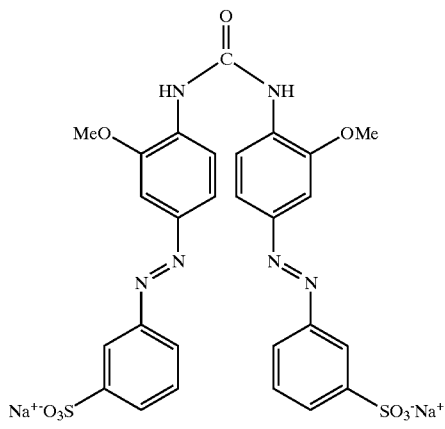

Dye 1
(Me is methyl)
Intrajet Yellow DG®
(Crompton and Knowles)

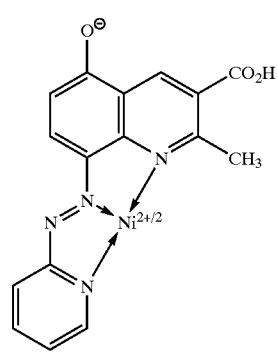

Dye 2

The dyes described above may be employed in any amount effective for the intended purpose. In general, good results have been obtained when the dye is present in an amount of from about 0.2 to about 5% by weight of the ink jet ink composition, preferably from about 0.3 to about 3% by weight. Dye mixtures may also be used.

In a preferred embodiment of the invention, the cationic polymer particles comprise a polymer having the formula:

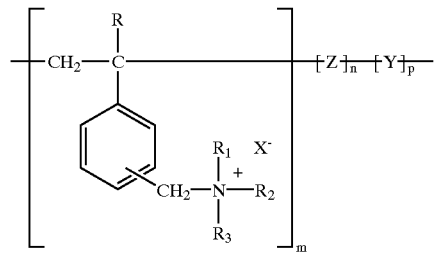

wherein:

R represents H or an alkyl group of from 1 to about 4 carbon atoms;

$R_1$ and $R_2$ each independently represents an alkyl group of from 1 to about 4 carbon atoms;

$R_3$ represents an alkyl group greater than 4 to about 20;

Z represents at least one ethylenically unsaturated, nonionic monomer;

Y represents an ethylenically unsaturated monomer which is capable of forming a water-insoluble homopolymer;

m represents a mole % of from about 5 to about 80;

n+p represents a mole % of from 20 to about 95; and

X represents an anion.

As noted above, Z in the formula represents at least one ethylenically unsaturated, nonionic monomer. Preferably Z represents a water soluble monomer including, for example, acrylamides; methacrylamides, isobutoxymethyl acrylamide, poly(ethylene glycol) (meth)acrylate, N-vinylpyrrolidone or suitably substituted vinylpyrrolidones.

Y in the above formula represents an ethylenically unsaturated monomer which is capable of forming a water-insoluble homopolymer. Examples of Y include styrene, divinyl benzene, alpha alkylstyrene where the alkyl group has 1 to 4 carbon atoms and the aromatic group in the alkylstyrene monomer may be substituted. Other examples of Y include acrylate and methacrylate esters derived from aliphatic alcohols or phenols; vinyl esters derived from straight chain and branched acids, e.g., vinyl acetate; vinyl ethers, e.g., vinyl methyl ether; vinyl nitriles; vinyl ketones; halogen-containing monomers such as vinyl chloride; and olefins, such as butadiene.

Specific examples of the cationic polymer particles useful in the invention include the following:

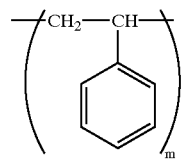

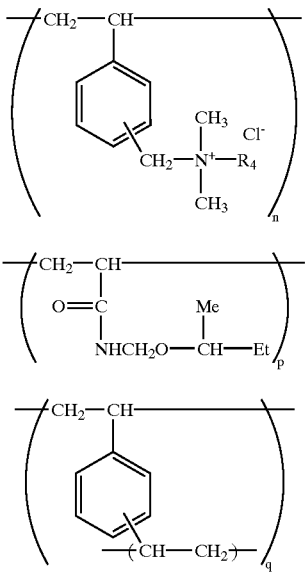

| Polymer | R₄ | Mole %, m | Mole %, n | Mole %, p | Mole %, q | Particle Size, nm |
|---|---|---|---|---|---|---|
| P-1 | —(CH₂)₁₇CH₃ | 0 | 100 | 0 | 0 | 10 |
| P-2 | —(CH₂)₁₇CH₃ | 50.6 | 10.1 | 33.5 | 5.8 | 12 |
| P-3 | —(CH₂)₁₁CH₃ | 50.6 | 10.1 | 33.5 | 5.8 | 15 |
| P-4 | —(CH₂)₇CH₃ | 50.6 | 10.1 | 33.5 | 5.8 | 15 |
| P-5 | benzyl | 50.6 | 10.1 | 33.5 | 5.8 | 48 |

The cationic polymer particle employed in the invention may be used in an amount of from about 0.2 to about 32 g/m², preferably from about 0.4 to about 16 g/m².

The cationic polymer particles used in this invention can be prepared using conventional polymerization techniques including emulsion, or suspension polymerization. The particles can also be crosslinked if desired.

The binder employed in the image-receiving layer is preferably a hydrophilic polymer. Examples of hydrophilic polymers useful in the invention include poly(vinyl alcohol), polyvinylpyrrolidone, poly(ethyl oxazoline), poly-N-vinylacetamide, non-deionized or deionized Type IV bone gelatin, acid processed ossein gelatin, pig skin gelatin, acetylated gelatin, phthalated gelatin, oxidized gelatin, chitosan, poly(alkylene oxide), sulfonated polyester, partially hydrolyzed poly(vinyl acetate-co-vinyl alcohol), poly(acrylic acid), poly(1-vinylpyrrolidone), poly(sodium styrene sulfonate), poly(2-acrylamido-2-methane sulfonic acid), polyacrylamide or mixtures thereof. In a preferred embodiment of the invention, the binder is gelatin or poly(vinyl alcohol).

The hydrophilic polymer may be present in an amount of from about 0.02 to about 30 g/m², preferably from about 0.04 to about 16 g/m² of the image-receiving layer.

The weight ratio of cationic polymer particles to binder is from about 1:99 to about 8:2, preferably from about 1:9 to about 4:6.

Latex polymer particles and/or inorganic oxide particles may also be used as the binder in the image-receiving layer to increase the porosity of the layer and improve the dry time. Preferably the latex polymer particles and/or inorganic oxide particles are cationic or neutral. Examples of inorganic oxide particles include barium sulfate, calcium carbonate, clay, silica or alumina, or mixtures thereof. In that case, the weight % of particulates in the image receiving layer is from about 80 to about 95%, preferably from about 85 to about 90%.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A humectant is employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetranethylene sulfone. A preferred humectant for the composition employed in the invention is diethylene glycol, glycerol, or diethylene glycol monobutylether.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition employed in the invention to suppress the growth of microorganisms such as molds, fungi, etc. in aqueous inks. A preferred biocide for the ink composition employed in the present invention is Proxel® GXL (Zeneca Specialties Co.) at a final concentration of 0.0001–0.5 wt. %.

A typical ink composition employed in the invention may comprise, for example, the following substituents by weight: colorant (0.05–5%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

The ink jet inks employed in this invention may be employed in ink jet printing wherein liquid ink drops are applied in a controlled fashion to an ink receptive layer substrate, by ejecting ink droplets from a plurality of nozzles or orifices of the print head of an ink jet printer.

The image-recording layer used in the process of the present invention can also contain various known additives, including matting agents such as titanium dioxide, zinc oxide, silica and polymeric beads such as crosslinked poly (methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; absorbing agents; mildew-proofing agents; mordants; antistatic agents, antioxidants, optical brighteners, and the like. A hardener may also be added to the ink-receiving layer if desired.

The support for the ink jet recording element used in the invention can be any of those usually used for inkjet receivers, such as paper, resin-coated paper, poly(ethylene terephthalate), poly(ethylene naphthalate) and microporous materials such as polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxally oriented support laminates. Biaxally oriented support laminates are described in U.S. Pat. Nos. 5,853,965; 5,866,282; 5,874,205; 5,888,643; 5,888,681; 5,888,683; and 5,888,714 incorporated by reference herein. These biaxally oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as polyethylene terephthalate, polyethylene naphthalate, poly-1,4-cyclohexanedimethylene terephthalate, polybutylene terephthalate, and copolymers thereof; polyimides; polyamides; polycarbonates; polystyrene; polyolefins, such as polyethylene or polypropylene; polysulfones; polyacrylates; polyether imides; and mixtures thereof. The papers listed above include a broad range of papers, from high end papers, such as photographic paper to low end papers, such as newsprint.

The support used in the invention may have a thickness of from about 50 to about 500 μm, preferably from about 75 to 300 μm. Antioxidants, antistatic agents, plasticizers and other known additives may be incorporated into the support, if desired. In a preferred embodiment, paper is employed.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 μm.

The image-recording layer may be present in any amount which is effective for the intended purpose. In general, good results are obtained when it is present in an amount of from about 2 to about 44 g/m$^2$, preferably from about 6 to about 32 g/m$^2$, which corresponds to a dry thickness of about 2 to about 40 μm, preferably about 6 to about 30 μm.

The following examples illustrates the utility of the present invention.

EXAMPLES

The following polymers were used as controls in the image receiving layer:

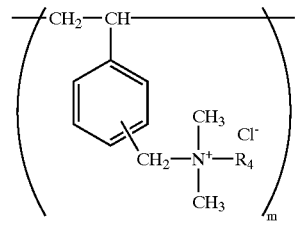

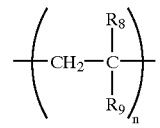

| Control Polymer | m (wt %) | n (wt %) | $R_4$ | $R_8$ | $R_9$ |
|---|---|---|---|---|---|
| CP-1 | 100 | 0 | —CH$_3$ | — | — |
| CP-2 | 100 | 0 | —CH$_2$(C$_6$H$_5$) | — | — |
| CP-3 | 87 | 13 | —CH$_3$ | H | 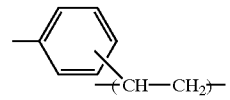 |

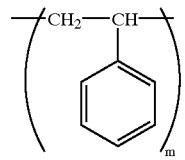

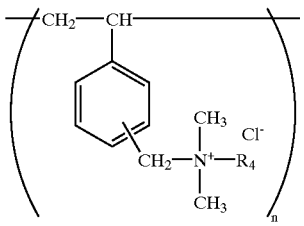

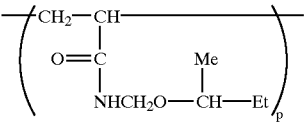

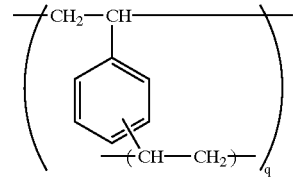

| Control Polymer | $R_4$ | m (mole %) | n (mole %) | p (mole %) | q (mole %) | Particle Size, nm |
|---|---|---|---|---|---|---|
| CP-4 | —CH$_3$ | 45.5 | 19.2 | 30.2 | 5.1 | 226 |
| CP-5 | —(CH$_2$)$_3$CH$_3$ | 50.6 | 10.1 | 33.5 | 5.8 | 72 |

Example 1

Light Stability
Preparation of Water Soluble, Anionic Dye Ink Composition, I-1

Ink I-1 containing Dye 1 was prepared by mixing the dye concentrate (3.1%) with de-ionized water containing humectants of diethylene glycol (Aldrich Chemical Co.) and glycerol (Acros Co.), each at 6%, a biocide, Proxel GXL® biocide (Zeneca Specialties) at 0.003 wt %. and a surfactant, Surfynol 465® (Air Products Co.) at 0.05 wt. %.

The dye concentration was based on solution absorption spectra and chosen such that the final ink when diluted 1:1000, would yield a transmission optical density of approximately 1.0

Preparation of Control Ink Recording Elements C-1 through C-5

The composite side of a polyethylene resin coated photographic grade paper based support was corona discharge treated prior to coating. Ink receptive layers were composed of a mixture of 0.86 $g/m^2$ of cationic polymer CP-1 through CP-5, 7.75 $g/m^2$ of pig skin gelatin and 0.09 $g/m^2$ of S-100 12 $\mu$m polystyrene beads (ACE Chemical Co.), and coated from distilled water on the above mentioned paper support.

Preparation of Invention Ink Recording Elements E-1 through E-5

Recording elements E-1 through E-5 of the invention were coated the same as described for C-1 through C-5, using P-1 through P-5 in place of CP-1 through CP-5.

Printing

Elements E-1 through E-5 and control elements C-1 through C-5 were printed using an Epson200® printer using I-1 ink described in Example 1. After printing, all images were allowed to dry at room temperature overnight, and the densities were measured at all steps using an X-Rite 820® densitometer. The images were then subjected to a high intensity daylight fading test for 2 weeks, 50 Klux, 5400° K., approximately 25%rh. The Status A blue reflection density nearest to 1.0 was compared before and after fade and a percent density retained was calculated for the yellow dye with each receiver element. The results can be found in Table 1 below.

TABLE 1

| Recording Element | Blue Density Before Fade | Blue Density After Fade | % Retained After Fade |
|---|---|---|---|
| E-1 | 1.0 | 0.81 | 81 |
| E-2 | 1.0 | 0.88 | 87 |
| E-3 | 0.97 | 0.85 | 87 |
| E-4 | 0.94 | 0.79 | 84 |
| E-5 | 0.98 | 0.70 | 71 |
| C-1 | 0.98 | 0.47 | 48 |
| C-2 | 0.99 | 0.48 | 49 |
| C-3 | 0.92 | 0.64 | 69 |
| C-4 | 1.07 | 0.69 | 65 |
| C-5 | 0.94 | 0.65 | 69 |

The above results show that the recording elements E-1 through E-5 of the invention, as compared to the control recording elements C-1 through C-5 gave higher % retained density after high intensity daylight fading.

Example 2

Light Stability for P-1 Level Series
Preparation of Invention Ink Recording Elements E-6 through E-10

Recording elements E-6 through E-10 of the invention were coated the same as described in Example 1, except the amounts of P-2 and pigskin gelatin were varied keeping the final layer thickness constant at 8.61 $g/m^2$. The amounts of each are summarized in Table 2 below.

TABLE 2

| Recording Element | $g/m^2$ of P-1 | $g/m^2$ of Pigskin Gelatin |
|---|---|---|
| E-6 | 0.86 | 7.75 |
| E-7 | 1.72 | 6.89 |
| E-8 | 2.58 | 6.03 |
| E-9 | 3.44 | 5.17 |
| E-10 | 4.3 | 4.31 |

Printing

Elements E-6 through E-10 and control elements C-3 and C-4 were printed as described in Example 1 above and the results can be found in Table 3 below.

TABLE 3

| Recording Element | Blue Density Before Fade | Blue Density After Fade | % Retained After Fade |
|---|---|---|---|
| E-6 | 1.07 | 0.88 | 82 |
| E-7 | 1.08 | 0.88 | 81 |
| E-8 | 1.09 | 0.88 | 81 |
| E-9 | 1.07 | 0.94 | 88 |
| E-10 | 1.08 | 0.92 | 85 |
| C-3 | 1.01 | 0.67 | 66 |
| C-4 | 1.07 | 0.69 | 64 |

The above results show that the recording elements E-6 through E-10 of the invention, as compared to the control recording elements C-3 through C-4, gave higher % retained density after high intensity daylight fading.

Example 3

Waterfastness
Preparation of a Water Soluble, Anionic Dye Ink Composition, 1-2

Ink I-2 was prepared as described in Example 1 except Dye 2 (0.58%) was added in place of Dye 1.

Printing

Elements E-1 through E-5 and control elements C-1 through C-5 were printed as described in Example 1 except I-1 2 was used in place of I-1. After printing, all images were allowed to dry at room temperature overnight.

The images were then subjected to a waterfastness test (WF) which involves soaking each imaged receiver in room temperature, distilled water for 5 minutes and then allowing the image to dry at room temperature overnight. The image quality of each print was then visually ranked and assigned a value between 0 and 5. The visual ranking is an indirect measure of how well the dye is fixed (dye fixation) to the receiver layer. Zero represents no image degradation (better dye fixation) and 5 represents severe image degradation (poor dye fixation) and the results are summarized in Table 4 below.

TABLE 4

| Recording Element | Polymer | WF Rank |
|---|---|---|
| E-1 | P-1 | 0 |
| E-2 | P-2 | 2 |
| E-3 | P-3 | 2 |
| E-4 | P-4 | 2 |
| E-5 | P-5 | 3 |

TABLE 4-continued

| Recording Element | Polymer | WF Rank |
|---|---|---|
| C-1 | CP-1 | 5 |
| C-2 | CP-2 | 4 |
| C-3 | CP-3 | 1 |
| C-4 | CP-4 | 5 |
| C-5 | CP-5 | 3 |

The above results show that the recording elements E-1 through E-5 of the invention, as compared to the control recording elements C-1, C-2 and C-4 gave better dye fixation after the waterfastness test. Although control receiver elements C-3 and C-5 showed comparable to better fixation after waterfastness using I-2 relative to the receiver elements of the invention, the light stability performance using I-1 was inferior (see results in Table 1 above).

Example 4

Light Stability using Particulates
Preparation of Control Ink Recording Elements C-6 through C-7

Control recording elements C-6 and C-7 were prepared as in Example 1 except the ink receptive layer was composed of 2 layers. The bottom layer contained a mixture of 37.9 g/m$^2$ of fumed alumina (Cabot Corp.), 4.3 g/m$^2$ of GH-23® poly(vinyl alcohol) (Nippon Gohsei), 0.9 g/m$^2$ of dihydroxydioxane (Clariant) hardener, and 0.04 g.m$^2$ of Olin 10 G® (Olin Co.) surfactant coated from distilled water.

On top of the above layer was then coated a mixture of 2.68 g/m9m$^2$ of fumed alumina, 0.06 g/m$^2$ of poly(vinyl alcohol), and 0.48 g/m$^2$ of CP-3 or CP-4 using distilled water.

Preparation of Invention Ink Recording Elements E-11 and E-12

Recording elements E-11 and E-12 of the invention were coated the same as described for control receiver elements C-6 and C-7, except P-1 and P-2 were used in place of CP-3 and CP-4.

Printing

The recording elements E-11 and E-12 of the invention and control recording elements C-6 and C-7 were printed as described in Example 1 above and the results are summarized in Table 5 below.

TABLE 5

| Recording Element | Polymer | Blue Density Before Fade | Blue Density After Fade | % Retained After Fade |
|---|---|---|---|---|
| E-11 | P-1 | 1.06 | 0.74 | 70 |
| E-12 | P-2 | 0.97 | 0.42 | 44 |
| C-5 | CP-3 | 0.99 | 0.31 | 31 |
| C-6 | CP-4 | 0.94 | 0.26 | 28 |

The above results show that the recording elements E-11 and E-12 of the invention, as compared to the control recording elements C-6 and C-7 gave higher % retained density after high intensity daylight fading.

Example 5

Gloss and Light Stability Using Particulates (Epson Inks)
Printing

The recording elements E-11 and E-12 of the invention and control recording elements C-6 were printed using the Epson 900® printer with corresponding Epson inks (color cartridge #T005 and black cartridge #T003). After printing, all images were allowed to dry at room temperature overnight.

The 20/60 Dmin gloss was measured for each receiver variation in an unprinted area using a Gardner Glossmeter. In addition, the densities of the printed areas were measured at all steps using an X-Rite 820® densitometer. The images were then subjected to a high intensity daylight fading test for either 1 or 2 weeks, 50 Klux, 5400° K., approximately 25% RH. The Status A blue, green or red reflection densities nearest to 1.0 was compared before and after fade and a percent density retained was calculated for the yellow, magenta and cyan dyes with each receiver element. The results can be found in Table 6 below.

TABLE 6

| Recording Element | Polymer | 20/60 Dmin Gloss | % Retained Yellow | % Retained Magenta | % Retained Cyan |
|---|---|---|---|---|---|
| E-11[1] | P-1 | 28/57 | 76 | 39 | 73 |
| C-5[1] | CP-3 | 21/43 | 67 | 16 | 90 |
| E-12[2] | P-2 | 41/66 | 68 | 40 | 81 |
| C-5[2] | CP-3 | 25/57 | 39 | 18 | 89 |

[1]1 week high intensity daylight fading
[2]2 weeks high intensity daylight fading The above results show that the recording elements E-11 and E-12 of the invention, as compared to the control recording element C-6 gave better gloss and higher % retained density after high intensity daylight fading the for yellow and magenta dyes under both conditions.

Example 6

Density Using Particulates
Preparation of Control Ink Recording Element C-8

Control recording element C-8 was prepared the same as C-6 and C-7 in Example 4 above except the top layer was composed of a mixture of 2.90 g/m$^2$ of fumed alumina, and 0.32 g/m$^2$ of GH-23 poly(vinyl alcohol).

Printing

The recording elements E-11 and E-12 of the invention and control recording element C-8 were printed using the Epson 900® printer with corresponding Epson inks. After printing, all images were allowed to dry at room temperature overnight and the densities at 100% coverage (Dmax) were measured for the yellow, magenta and cyan dyes using an X-Rite 820® densitometer. The results can be found in Table 7 below.

TABLE 7

| Recording Element | Dmax Density Yellow | Dmax Density Magenta | Dmax Density Cyan |
|---|---|---|---|
| E-11 | 1.66 | 1.75 | 2.11 |
| C-8[1] | 1.34 | 1.54 | 2.02 |
| E-12 | 1.50 | 1.54 | 2.02 |
| C-8[2] | 1.23 | 1.31 | 1.53 |

[1]control for E-11
[2]control for E-12

The above results show that the recording elements E-11 through E-12 of the invention, as compared to the control recording element C-8, gave higher densities at 100% coverage.

The invention has been described in detail with particular reference to certain preferred embodiments thereof, but it will be understood that variations and modifications can be effected within the spirit and scope of the invention.

What is claimed is:

1. An ink jet printing method, comprising the steps of:
   A) providing an ink jet printer that is responsive to digital data signals;
   B) loading said printer with ink-receptive elements comprising a support having thereon an image-receiving layer comprising a binder and cationic polymer particles containing at least one ethylenically unsaturated monomer containing a trialkylammonium salt, each said trialkylammonium salt containing at least one alkyl group greater than 4 carbon atoms in length;
   C) loading said printer with an ink jet ink composition comprising water, a humectant, and a water-soluble anionic dye; and
   D) printing on said image-receiving layer using said ink jet ink in response to said digital data signals.

2. The method of claim 1 wherein said cationic polymer particles comprise a polymer having the formula:

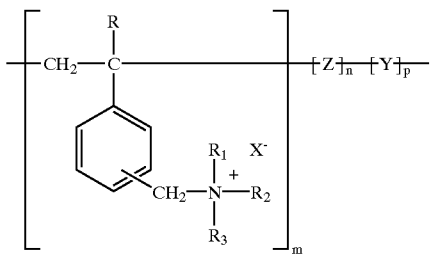

wherein:
   R represents H or an alkyl group of from 1 to about 4 carbon atoms;
   $R_1$ and $R_2$ each independently represents an alkyl group of from 1 to about 4 carbon atoms;
   $R_3$ represents an alkyl group greater than 4 to about 20;
   Z represents at least one ethylenically unsaturated, non-ionic monomer;
   Y represents an ethylenically unsaturated monomer which is capable of forming a water-insoluble homopolymer;
   m represents a mole % of from about 5 to about 80;
   n+p represents a mole % of from 20 to about 95; and
   X represents an anion.

3. The method of claim 1 wherein said cationic polymer particles have a mean particle size of greater than 10 nm.

4. The method of claim 2 wherein Y is styrene or divinyl benzene.

5. The method of claim 2 wherein Z represents isobutoxymethyl acrylamide.

6. The method of claim 2 wherein $R_1$ and $R_2$ are $CH_3$ and $R_3$ is a C-4 to C-8 alkyl group.

7. The method of claim 2 wherein X is chloride.

8. The method of claim 1 wherein said humectant is diethylene glycol, glycerol or diethylene glycol monobutylether.

9. The method of claim 1 wherein said binder is a hydrophilic polymer.

10. The method of claim 9 wherein said hydrophilic polymer is gelatin or poly(vinyl alcohol).

11. The element of claim 1 wherein said binder contains particulates.

12. The element of claim 11 wherein said particulates are inorganic oxides or organic latex polymers.

13. The element of claim 11 wherein said particulates are barium sulfate, calcium carbonate, clay, silica or alumina.

14. The method of claim 1 wherein said anionic dye comprises about 0.2 to about 5% by weight of said ink jet ink composition.

* * * * *